April 7, 1931.  E. L. FICKETT  1,799,460
GEAR CUTTING MACHINE
Filed Nov. 2 1928  4 Sheets-Sheet 1

INVENTOR:
Ernest L. Fickett
BY
Maurice C. Landers
his ATTORNEY.

April 7, 1931.  E. L. FICKETT  1,799,460
GEAR CUTTING MACHINE
Filed Nov. 2 1928   4 Sheets-Sheet 2

INVENTOR:
Ernest L. Fickett
BY
Maurice B Landers
his ATTORNEY.

April 7, 1931.　　　　E. L. FICKETT　　　　1,799,460
GEAR CUTTING MACHINE
Filed Nov. 2 1928　　　　4 Sheets-Sheet 3

INVENTOR:
Ernest L. Fickett
BY
Maurice B. Landers
his ATTORNEY

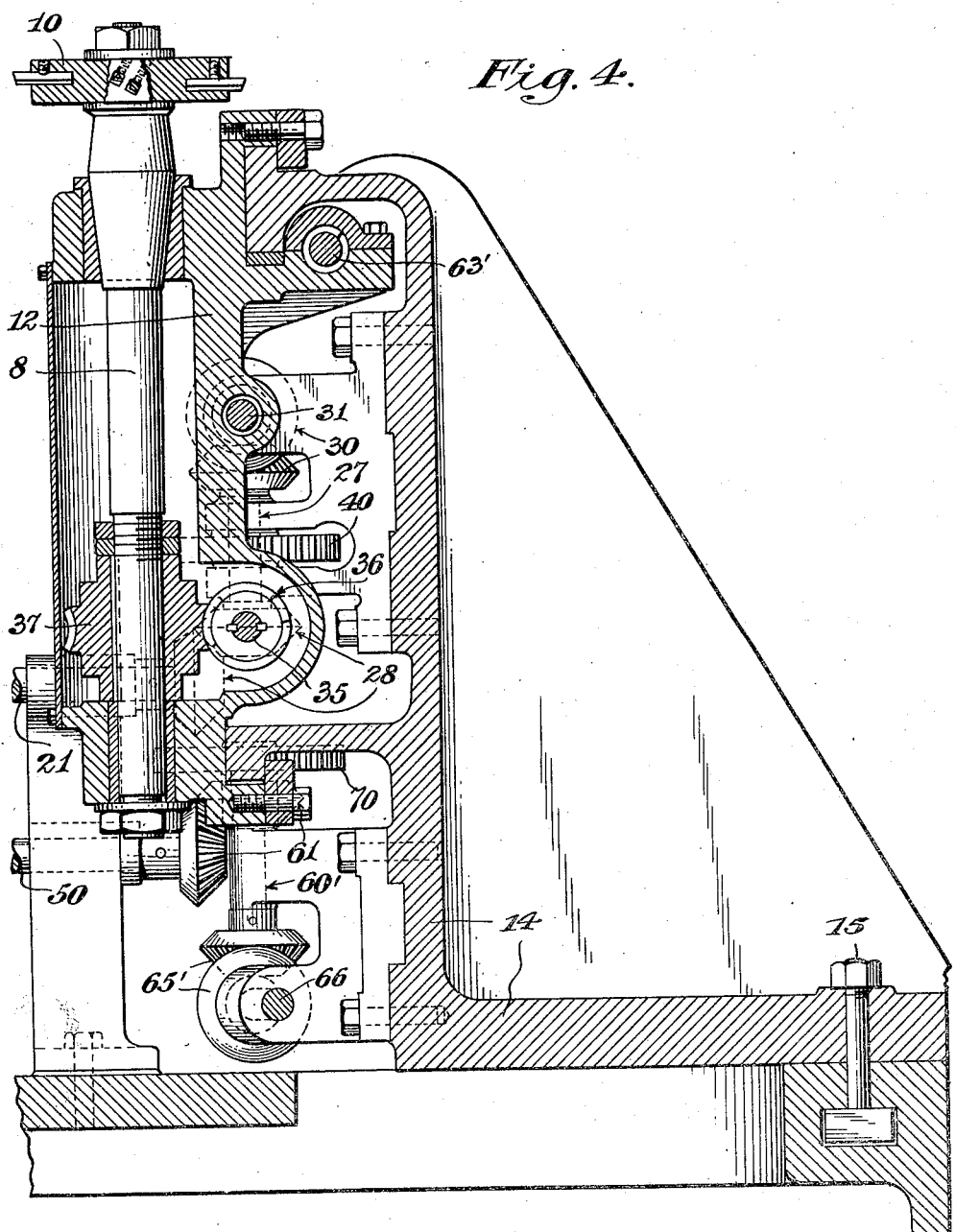

Patented Apr. 7, 1931

1,799,460

UNITED STATES PATENT OFFICE

ERNEST L. FICKETT, OF FITCHBURG, MASSACHUSETTS, ASSIGNOR, BY MESNE ASSIGNMENTS, TO SCURLOCK GEAR CORPORATION, OF NEW YORK, N. Y., A CORPORATION OF NEW YORK

GEAR-CUTTING MACHINE

Application filed November 2, 1928. Serial No. 316,638.

The present invention has for an object to provide an improved gear cutting machine.

Spiral bevel gears may be cut to provide teeth of substantially equal width throughout their length with spaces of varying width or they may be cut to provide spaces of substantially equal width with teeth of varying width or other provision can be made for making allowance for the variation in diameter at different points of the gears. The practical limitations of the machines used determine in part the form of the teeth.

The present invention provides in its preferred form a machine having separate cutters which can be operated, to some extent, independently of each other to cut the opposite faces of the teeth. This arrangement makes possible the desired shaping of the teeth without limitations that are imposed when one cutter must simultaneously engage opposite tooth faces. The machine to be particularly described is designed normally to cut gear teeth having the form of an Archimedean spiral, and the two cutters and the cutter feeding mechanism can be so adjusted that the opposite faces of the teeth will cut on spirals which approach each other to provide teeth having a desired taper. The machine may be adjusted and the cutters so shaped that each cutter forms complete teeth.

The nature and objects of the invention will be better understood from a description of the selected embodiment, for the purposes of which description reference should be had to the accompanying drawings forming a part hereof and in which—

Figure 4 is a detail sectional view taken on the line IV—IV of Fig. 1.

Figure 5:
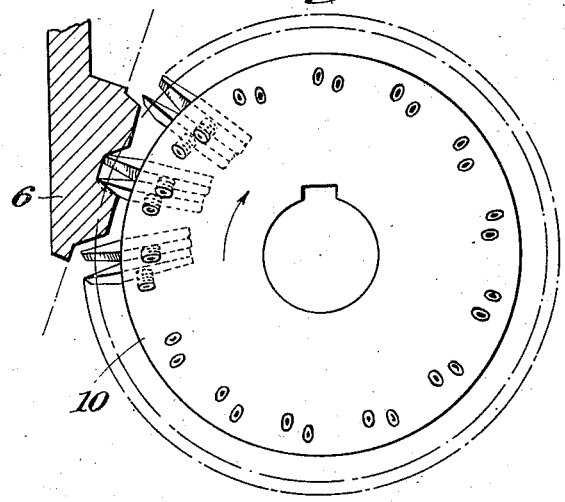
Figure 5 is a detail view of one of the cutters.
Figure 6:
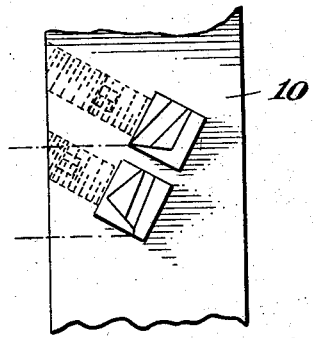
Figure 6 is an enlarged view of a section of the edge of one of the cutters.

The machine shown for the purposes of illustrating the invention comprises a central horizontal work spindle 5 arranged to carry a work blank 6 at its forward end and two vertical cutter spindles 7, 8 arranged to carry cutters 9, 10 at their upper ends. The two cutter spindles may be driven more or less independently but as here shown they are driven at the same speed and both at uniform speed. They are adjusted to cut opposite faces of the gear teeth. If desired each cutter may be provided with cutting teeth arranged in pairs, as shown in Figures 5 and 6, so that one tooth of a pair can rough and another finish the gear, the roughing tooth, of course, being slightly in advance of the finishing tooth.

By so arranging the cutters that one cuts one side of each gear tooth and the other cuts the other side of each tooth, it is possible to so position the cutters that they will both cut in a horizontal plane through the axis of the blank and with such a feeding movement that both sides of the gear teeth will be cut to the desired curves. The cutter spindles are mounted on carriages 11 and 12 for movement along the face of the gear from the periphery toward the center and these carriages are in turn supported on saddles 13, 14 which are angularly adjustable on the bed of the machine and arranged to be clamped in adjusted position by bolts 15. In operation the work spindle is rotated in one direction or the other as it is desired to cut a right or left spiral gear. If desired, instead of reversing the direction of rotation of the work blank right and left hand spiral gears may be cut by reversing the direction of feed of the cutters along the face of the gear, one being cut by moving the cutters from the periphery toward the center and the other being cut by moving the cutters from the center toward the periphery.

Figure 1:
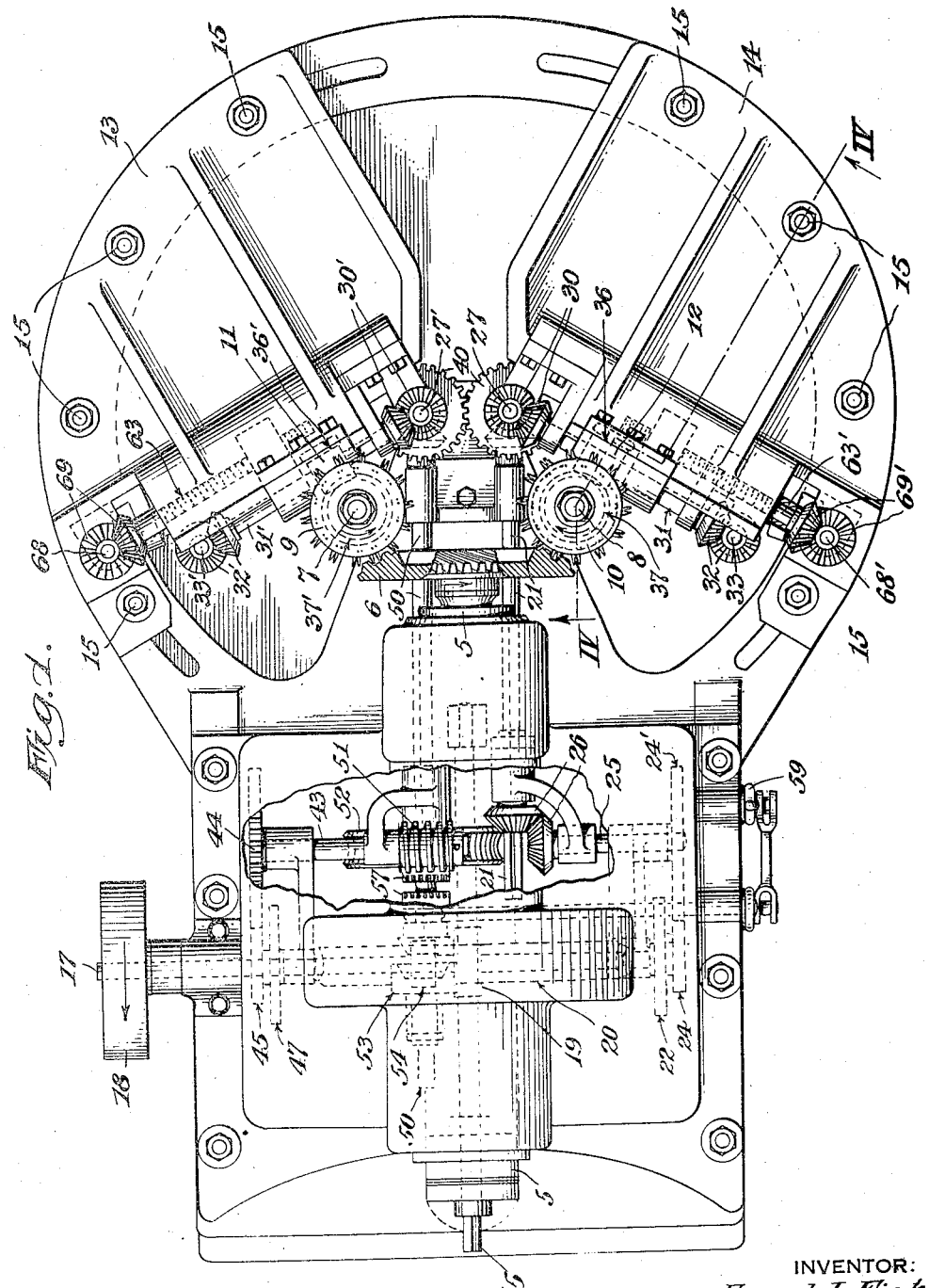
Figure 1 is a plan view of a gear cutting machine embodying the invention.
Figure 2:
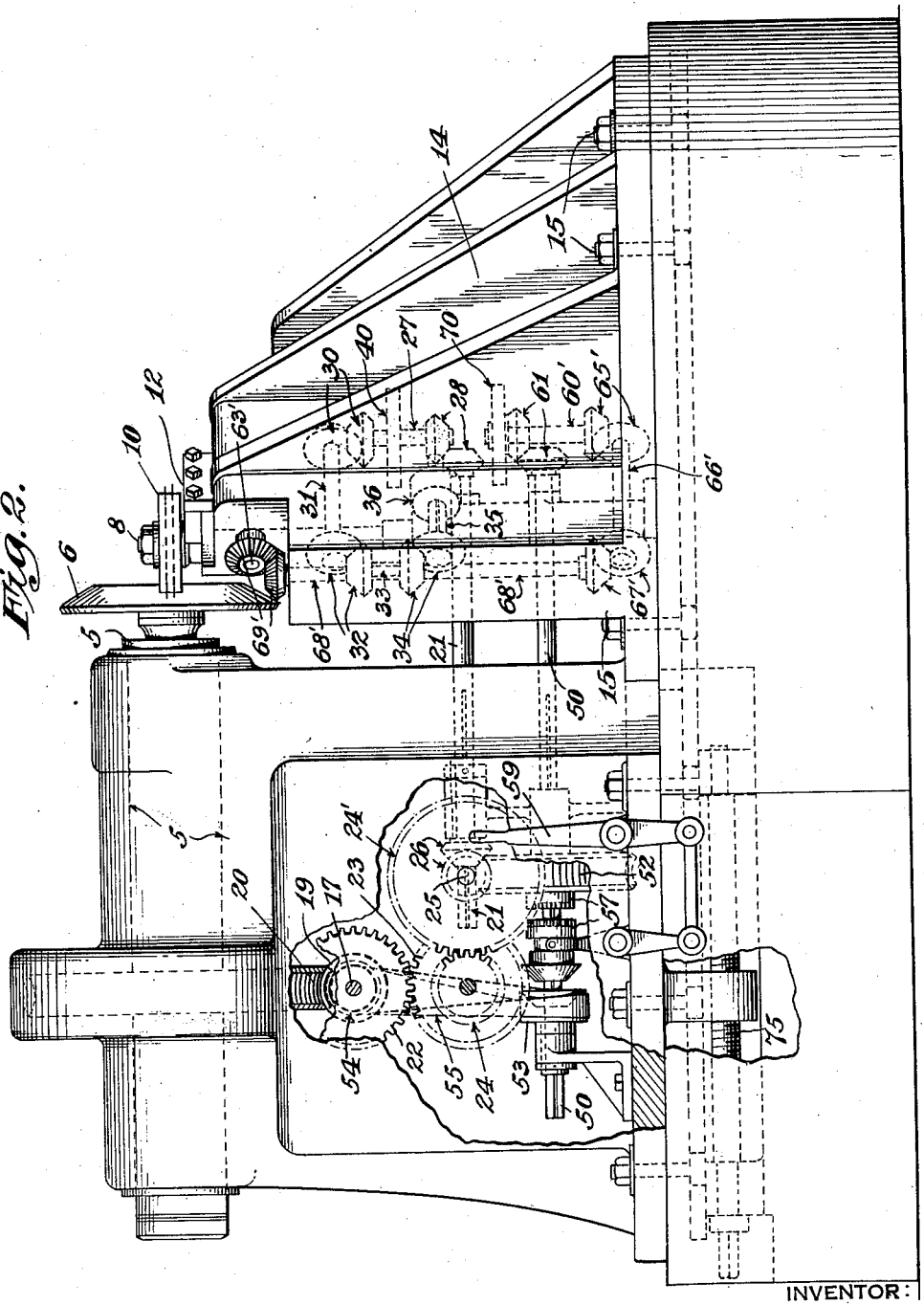
Figure 2 is a view in side elevation, some parts being broken away and some parts being shown in section.
Figure 3:
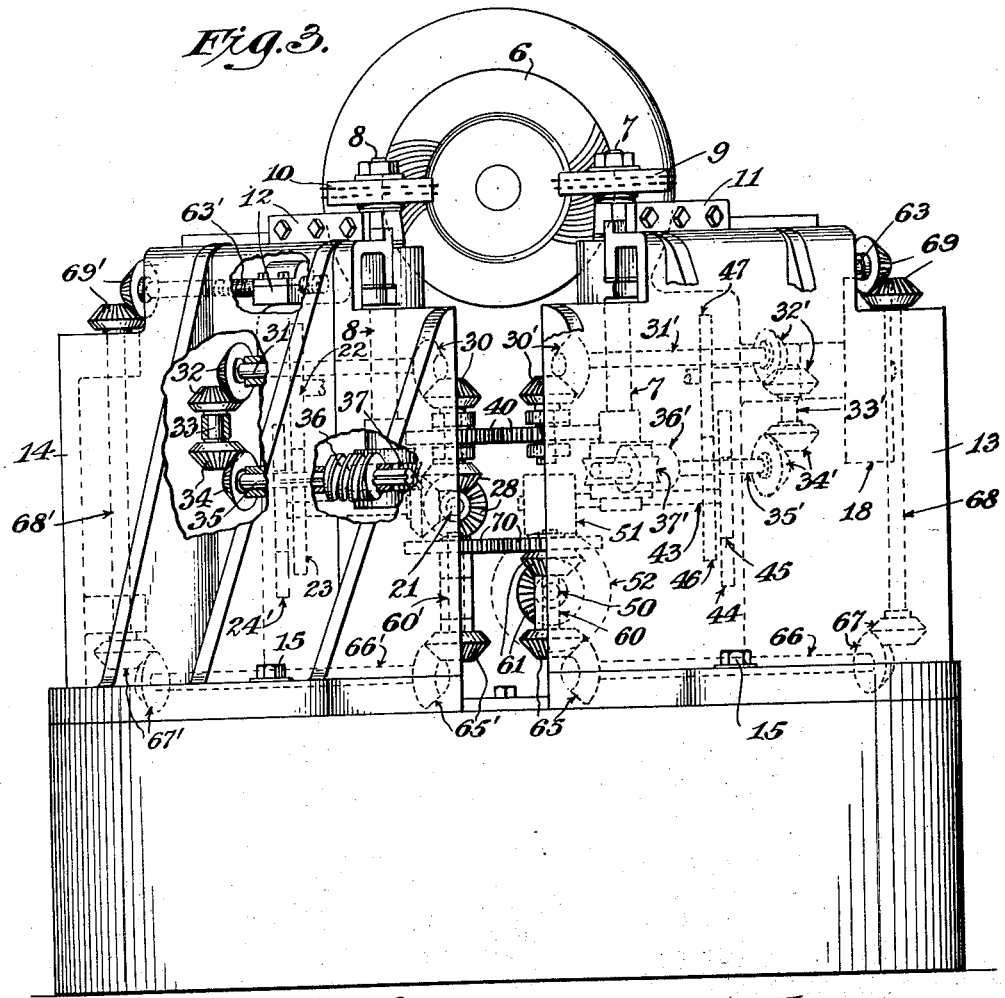
Figure 3 is a view in front elevation, some parts being broken away.

Power is supplied to the main transverse power shaft 17 through a pulley 18 and the work spindle 5 is driven therefrom by a worm 19 and worm wheel 20 on the power shaft and work spindle, respectively. The machine shown is designed and set up for cutting left hand spiral gears and, therefore, the spindle is driven in the direction indicated by the arrow in Fig. 1. For the sake of simplicity of disclosure no reversing mechanism is shown, but it will be understood that a reversing mechanism may readily be provided if it is desired to use the same machine for cutting both right and left spiral gears.

The cutters are rotated and fed along the face of the work by power taken from the main power shaft 17. The gearing for driving the cutters comprises a shaft 21 (Fig. 1) extending longitudinally of the machine and driven from the main power shaft 17 by change speed gears 22, 23, 24, 24', shaft 25 and miter gears 26. A vertical shaft 27 mounted in the saddle 14 in the line of the axis about which the saddle is rotatably adjustable is driven from the horizontal shaft 21 by means of miter gears 28. The cutter spindle 8 is driven from the shaft 27 through a suitable train of gearing which is shown as comprising miter gears 30, horizontal shaft 31, miter gears 32, vertical shaft 33, miter gears 34, and horizontal shaft 35, with a worm 36 on shaft 35 engaging a worm wheel 37 on the cutter spindle 8, all of which gearing is carried in the saddle 14. The companion cutter spindle 7 of the saddle 13 is similarly driven by similar gearing and receives power from the vertical shaft 27 through a pair of spur gears 40 on the vertical shafts 27 and 27'. The corresponding gears and shafts of the saddle 13 are for the most part designated by the same characters as the corresponding shafts and gears of the saddle 14, but with prime exponents.

The carriage feed also is driven from the shaft 17 but preferably by a drive mechanism which is independent of the cutter drive. As shown, a transverse shaft 43 is driven from the main power shaft 17 by change speed gears 44, 45, 46, 47. A longitudinal shaft 50 is driven in one direction for the cutting feed from the transverse shaft 43 by means of a worm 51 and worm wheel 52, and is driven in the reverse direction for the idle return through pulleys 53 and 54 on the shafts 50 and 17, respectively, a quarter turn belt 55 connecting said pulleys. The worm wheel 52 and the pulley 53 are arranged to be alternatively clutched to the shaft 50 by means of a double clutch 57 which is operated by a hand lever 59 through a suitable connecting link mechanism.

A vertical shaft 60 carried by the saddle 13 in the axis about which said saddle is adjustably mounted is driven from the shaft 50 by miter gears 61. The carriage 11 is moved along its ways by a feed screw 63 which in the particular machine shown is a screw of uniform pitch but it will be understood that this screw is in the nature of a cam for controlling the feed of the cutter and can be of any desired character. If gears of other than Archimedean spiral curve are to be cut, this cam screw will be designed to give the required motion, or a cam of any suitable type may be substituted.

The feed screw 63 is driven from the vertical shaft 60 through a suitable train of gearing which is shown as comprising miter gears 65, horizontal shaft 66, miter gears 67, vertical shaft 68 and miter gears 69. The carriage 12 is similarly operated from the same source of power through a train of mechanism which is designated by the same reference characters but with prime exponents. The shaft 60 and the shaft 60' are connected by spur gears 70. The feed screw 63' or cam, if it is not a true screw, will ordinarily have the same pitch as the fed screw 63.

The work spindle is longitudinally movable toward and from the cutters to permit adjustment of the work relative to the cutters. As shown in the drawing, the headstock of the machine is adjustable on the bed and may be moved by means of an adjusting screw 75. The horizontal longitudinal shafts 21 and 50 are splined and longitudinally movable within the several gears in the headstock and in the clutch and pulley thereon to permit this movement of the headstock.

It will be noted that one of the cutters is inverted to correspond to the movement of the work. The cutters may be of any suitable shape. The cutter shown in Fig. 5 is so designed that the cutting edges for opposite sides of the tooth faces lie in substantially the same plane. In setting up the machine the cutters should be adjusted vertically on their spindles to suitable positions having due regard to the cutting effect desired. Ordinarily all cutting edges should lie substantially in a plane through the axis of the gear to be cut.

The provision of two cutters as illustrated makes possible the shaping of the teeth of the cutter more effectively to meet requirements. Whether the teeth are cut on an Archimedean spiral or logarithmic or other spiral the drive and feed mechanism when desired may be so related that each cutter cuts on a spiral terminating at the apex as distinguished from an arrangement in which the opposite tooth faces are cut on lines substantially parallel to each other. Accordingly better meshing gears may be provided.

The foregoing description of a particular embodiment is illustrative merely and is not intended as defining the limits of the invention.

I claim—

1. A gear cutting machine for use in cutting spiral bevel gears comprising a gear blank supporting spindle, a pair of cutters having their axes at an angle to said spindle, means for rotating the cutters and the gear blank at speeds proportioned according to the number of teeth on said cutters and blank in such relation to each other that each tooth of each cutter moving in the direction of a tooth space on the blank passes into and out of said space during relative rotation of said cutters and blank and means for feeding the cutters relatively along the face of the blank.

2. A gear cutting machine as defined in claim 1 in which the cutters are mounted in guides adjustable angularly relative to the gear blank supporting means.

3. A gear cutting machine as defined in claim 1 wherein the cutters are moved along the face of the blank by independent feeding means.

4. A gear cutting machine for cutting spiral bevel gears comprising, in combination, a rotatable work carrying spindle, a pair of carriages movable parallel to opposite sides of a work blank carried on said spindle, rotatable cutting tools carried by said carriages for cutting opposite faces of gear teeth on said blank, and means for simultaneously rotating said spindle and said cutting tools to cut teeth on said blank.

5. A gear cutting machine for cutting spiral bevel gears comprising, in combination, a rotatable work spindle, a pair of cutting tools movable along opposite sides of a blank carried by said spindle to cut gear teeth thereon, a carriage in which each cutting tool is carried, means for adjusting the angular direction of movement of said carriages, and means for simultaneously driving said work spindle and shifting said cutting tools along said blank.

In testimony whereof, I have signed my name to this specification this 9th day of October, 1928.

ERNEST L. FICKETT.